May 26, 1931.   C. E. McMANUS   1,806,880
METHOD OF MAKING BOTTLE CLOSURES
Filed June 27, 1925
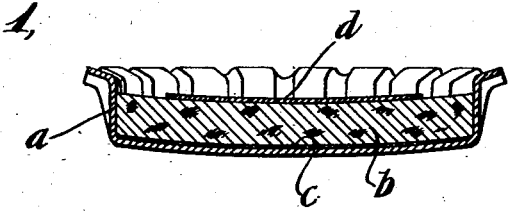
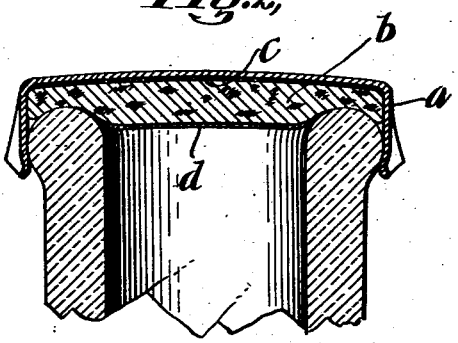
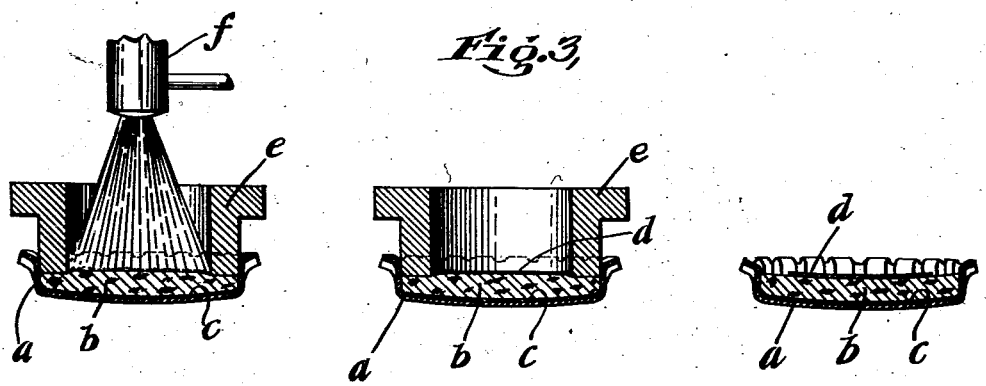

Patented May 26, 1931

1,806,880

UNITED STATES PATENT OFFICE

CHARLES E. McMANUS, OF NEW YORK, N. Y., ASSIGNOR TO CROWN CORK & SEAL COMPANY, INC., OF NEW YORK, N. Y., A CORPORATION OF NEW YORK

METHOD OF MAKING BOTTLE CLOSURES

Application filed June 27, 1925. Serial No. 40,126.

My invention relates to the method of making bottle closures, and more particularly bottle closures of the crown type in which the cushion disk is formed of composition cork.

Composition cork is formed of granules of natural cork cemented together by a very thin coating of a suitable adhesive. This material is ordinarily produced of what is known as waste cork or refuse cork resulting from the production of stoppers and other articles of natural cork.

The uses to which composition cork is put have increased in recent years, and the natural cork waste available for its production not only has not increased in proportion to the incresed quantity of composition cork being made, but in fact has actually decreased so that the supply of the better grade of cork waste available for the production of composition cork is not sufficient to meet demands for this waste at the present time, and under present manufacturing conditions.

In the production of composition cork, it is customary to use fairly large cork granules mixed with finer granules, the harder particles of the cork, from toward the outer surface of the cork wood, being separated from these granules since they lack the degree of flexibility and compressibility necessary to the production of the cushion disks or seals for bottle caps, particularly when gelatinous cements are used, notwithstanding that these cements are of the nature of synthetic rubber.

With the harder particles of cork wood there is a poorer bonding action secured with the cement used in making the composition cork, and a much greater tendency toward the disintegration of the composition cork as a result of the action of liquids thereon when the caps are in position upon a bottle containing such liquids.

With the above conditions in mind, I have produced a bottle closure or cap so formed that the lower grades of cork wood may be used in composition cork cushion disks forming a part of such caps, the central portion of the exposed face of this cushion being provided with a very thin coating of a highly resilient substance so as to protect the cement in the composition cork of the cushion disk from the contents of a bottle, the disk about this central portion having an uncoated portion of sufficient width to permit of the sealing of the neck of a bottle by a direct contact between same and this narrow strip of uncoated composition cork adjacent the rim of the metallic shell. The material of which this central facing is composed possesses considerable tenacity, is not responsive to changes in temperature or atmospheric conditions, and is sufficiently transparent and is applied in sufficiently thin stratum, to cause the entire exposed face of the composition cork disk to vary so little as to make the presence of this coating non-apparent to the causal observer. The material of the disk will cement itself firmly to the composition cork and will not be affected by the contents of a bottle while effectively protecting the cement of the composition cork of the disk from the action of such contents.

By the method of my invention, the facing may be applied with great rapidity to the cushion disks of bottle caps, and the area coated with the facing material, which when applied to the disk is in a viscous or semi-liquid form, will be accurately defined as to the area covered thereby, and this area will be practically the same as to all disks.

In addition to thus facing the disk in the manner above described, I use a composition cork disk in which rubber is used as the cementing medium, this rubber however, being incorporated in the mixture not as a liquid or semi-liquid cement, but in a manner which will not only ensure a thorough application of the rubber to the cork granules in the form of a superficial coating, but the working of the cork in a manner which will soften the harder cork granules, and by possible breaking up of some of the cork granules cause great homogeneity in the product. It is immaterial to the invention whether this cork composition be compressed into tubular rod form or in sheets before forming the cushion disks thereof.

The invention consists primarily in a bottle closure consisting of a skirted metallic shell, a resilient sealing disk secured within said shell, and a thin film of nitro-cellulose upon the exposed face of said disk, the edge of this film being concentric with the skirt of said metallic shell, but spaced therefrom, whereby the neck of a bottle is sealed directly against the uncoated portion of said disk, and contact of the contents of a bottle with the composition cork of the disk is prevented; and in such other novel characteristics, and in the method of making such a closure, all as hereinafter set forth and described and more particularly pointed out in the claims hereto appended.

Referring to the drawings,

Fig. 1 is a sectional view, upon an enlarged scale, of a bottle closure embodying my invention;

Fig. 2 is a similar view thereof upon a bottle; and

Fig. 3 is a diagrammatic view illustrating the method of applying the facing film to the cushion disk.

Like letters refer to like parts throughout the several views.

In the embodiment of my invention shown in the drawings, $a$ indicates a skirted metallic shell such as is usually employed in bottle caps of the crown type, and $b$ a composition cork cushion disk positioned within the skirt of said shell and cemented to the inner top of the shell by a stratum $c$ of any desired or suitable cement, glue or adhesive. Upon the exposed face of the disk $b$ is a thin film or coating $d$ of nitro-cellulose, the edge of this film being concentric with the skirt of said shell but being spaced therefrom a distance to expose the composition cork throughout a sufficient area to ensure the lip of a bottle sealing directly against same while causing the film of nitro-cellulose to cover all portions of the disk $b$ exposed to the contents of a bottle. This nitro-cellulose will of itself adhere firmly to the material of the composition cork disk, is insoluble in the presence of almost all beverages and will afford protection to the cement used in the composition cork to an extent to avoid disintegration of the disk even after long exposure to the contents of a bottle. At the same time this coating while preventing contact of the contents of the bottle with the cork or the cement, will prevent contamination of the contents of the bottle due to contact with the cork or the cement embodied in the cushion disk.

The nitro-cellulose is in as thin a film as is feasible while still securing a complete covering of the central portion of the disk $b$, possesses sufficient flexibility to respond to the deformation of the disk resulting from the pressure exerted when applying a cap to a bottle, and when in a very thin film is almost transparent or at least highly translucent. When so used the entire exposed surface of the disk has substantially the same appearance. If, however, it be desired to contrast the nitro-cellulose coating with the uncoated portion of the disk, color pigment may be mixed with the nitro-cellulose to give any desired appearance to the coated portion of the disk.

While, by the method of making caps in accordance with my invention, the film of nitro-cellulose may be effectively applied to the composition cork disk, irrespective of the quality of the cork in the granules, or of the binder used when binding these granules together, I preferably use a composition cork disk, the granules of which are bonded together by means of rubber as distinguished from a rubber or other cement. In the production of the composition cork from which said disks are made, I thoroughly commingle the cork granules with a vulcanizable rubber compound using approximately parts of the granules of cork to one part of rubber by weight. To facilitate the vulcanization of the rubber in the subsequently compacted mass containing said granulated cork, I add an accelerator such as diphenol of granidine or formaldehyde to the rubber compound. The cork is thoroughly mixed with the rubber compound in an ordinary rubber milling machine.

The pressure exerted by the milling machine upon the mass of composition being treated has the effect of repeatedly distorting the several cork granules in a manner to have a softening action upon the cork, thus softening the harder cork granules to an extent to permit their effective use in the production of cushion disks for bottle caps. This pressure will also tend to break the larger cork granules and secure that intimate relation between the rubber compound and both the larger and smaller cork granules, to ensure great homogeneity in disks made from the product of the milling machine.

The method of producing caps embodying my invention, permits the application of the facing film of nitro-cellulose to already assembled caps or to such caps during the operation of assembling same. In other words, the method may be practiced in a machine, the sole function of which is to apply this facing film, or an ordinary assembling machine may have incorporated therein the necessary parts to apply the film to the composition cork sealing disk during the assembly of the cap. In either instance the method will be the same and the product will be the same.

In the method of applying the facing film to the composition cork cushioning disk, I first subject this disk adjacent the skirt of a metallic shell to a pressure sufficient to compress the disk adjacent said skirt and toward the center of the disk a distance coinciding with the area of the disk which it is desired to have remain uncoated. This is done by means of an annular presser member e. While the portion of the material of the disk adjacent the edge thereof is thus compacted, I spray collodion upon the portion of the disk exposed within the member e by means of an atomizer f or any other mechanism for comminuting the collodion. If a film of the desired thickness is not secured as a result of a single spraying action, this step may be repeated.

The presser ring or annulus e will define the area upon which the collodion may be sprayed as described, the pressure exerted thereby upon the cork preventing the extension of the coated area as a result of the diffusion of the collodion after it is applied in a sort of stipple. The outside diameter of the member e is substantially the same as the inside diameter of the skirt of the shell a so that the facing film applied to the space within the member e will be accurately centered, as to each cap, with relation to the cushion disk d. The pressure is maintained momentarily after the collodion is sprayed upon the disk, to permit slight diffusion thereof, and also to permit the setting of the collodion due to the rapid evaporation of the ether and alcohol, or other solvent for the nitro-cellulose. If desired, heat may be applied to the caps during the application of the collodion to the disk in order to expedite the setting of the collodion.

So far as the application of the facing film is concerned, after the pressure from the presser ring or annulus is relieved, no subsequent treatment is required, although the subsequent application of heat and pressure, or pressure alone to the otherwise completed cap, will not modify the facing film in any way.

Collodion of itself is strongly adhesive, and thus will be firmly bonded to the composition cork disk as the solvent for the nitro-cellulose evaporates. By applying the collodion in a fine spray, it will penetrate the pores of natural cork and anchor itself firmly thereon. When applied in a very thin film it will set with great rapidity, which setting will be accelerated by the presence of the compressed air, used in forming the spray. Furthermore by this method a very thin film of collodion may be applied to the disk within the area defined by the presser ring, thus permitting the resulting film of nitro-cellulose to be very thin and highly flexible. The use of a very thin film has the further advantage that the solvent in the collodion will evaporate very rapidly, thus making the time factor for applying the facing material so small as to permit a large production output. Furthermore the less the quantity of the collodion applied to the cushion disk of each cap, and the shorter the time interval, the more economical is the production of such caps.

Heretofore I have produced caps having a facing disk of parchment paper, metal foil, or other like material, cemented firmly to the exposed face of the cushion disk. Caps embodying my present invention, however, afford as effective a protection for the composition cork and for the contents of a bottle as such other disks, and may be produced more rapidly and at a much lower cost. Furthermore, in caps embodying my present invention there is no likelihood of a separation of the facing film from the cushion disk, or a partial separation thereof.

By spraying the collodion upon the cushion disk, the entire portion of the disk within the pressure ring may be rapidly coated with a very thin film of collodion, which although applied in the form of spray, will diffuse, or flatten out, into a continuous film. The presser ring e forms a positive barrier preventing the extension of the coated portion of the disk beyond the area defined by said ring, the pressure being relieved before the collodion has completely set.

It is not my intention to limit the invention to the precise details of construction herein described, nor to any particular time interval in applying the collodion, since the latter will vary with a varying degree of fluidity in the collodion.

Having described the invention, what I claim as new and desire to have protected by Letters Patent, is:—

1. The herein described method of making bottle closures including the step of spraying a solution of cementitious material containing a water insoluble, inherently flexible, base, and a volatile solvent upon the exposed face of a cushion disk while within a metal shell.

2. The herein described method of making bottle closures includng the step of spraying collodion upon the exposed face of a cushion disk within a metal shell.

3. The herein described method of making bottle closures including the steps of covering and compressing an annular portion of a resilient cushion disk adjacent the edge thereof and spraying a cementitious material containing a water insoluble, inherently flexible, base, and a volatile solvent upon the exposed face of the uncompacted portion of said disk.

4. The herein described method of making bottle closures including the steps of covering and compressing an annular portion of a resilient cushion disk adjacent the edge thereof and spraying collodion upon the exposed face of the uncompacted portion of said disk.

5. The herein described method of making bottle closures including therein the steps of comminuting a fluid cementitious material containing a water insoluble, inherently flexible, base, and a volatile solvent and depositing it upon the exposed face of a cushion disk within a metallic shell by means of a jet of air.

6. The herein described method of making bottle closures including therein the steps of comminuting collodion and depositing it upon the exposed face of a cushion disk within a metallic shell by means of a jet of air.

7. The herein described method of making bottle closures including therein the steps of covering and compressing an annular portion of a resilient cushion disk within a metallic shell, adjacent the edge thereof, comminuting a fluid cementitious material containing a water insoluble, inherently flexible, base, and a volatile solvent and depositing it upon the exposed face of the uncompacted portion of the cushion disk by means of a jet of air.

8. The herein described method of making bottle closures including therein the steps of covering and compressing an annular portion of a resilient cushion disk within a metallic shell, adjacent the edge thereof, comminuting collodion and depositing it upon the exposed face of the uncompacted portion of the cushion disk by means of a jet of air.

In witness whereof I have hereunto affixed my signature, this 22nd day of June, 1925.

CHARLES E. McMANUS.